United States Patent [19]

Luther

[11] Patent Number: 5,167,898

[45] Date of Patent: Dec. 1, 1992

[54] INJECTION MOLD ASSEMBLY AND METHOD FOR MANUFACTURING A PLASTIC TUB WITH HOLES

[75] Inventor: LeRoy D. Luther, Brookfield, Wis.

[73] Assignee: Triangle Tool Corporation, Milwaukee, Wis.

[21] Appl. No.: 847,664

[22] Filed: Mar. 5, 1992

[51] Int. Cl.[5] ............................................. B29C 33/44
[52] U.S. Cl. ................................ 264/328.1; 264/334; 249/64; 249/145; 249/150; 425/330; 425/577; 425/DIG. 58
[58] Field of Search ...................... 264/318, 328.1, 334; 249/64, 140, 144, 145, 150; 425/330, 438, 468, 577, DIG. 58

[56] References Cited

U.S. PATENT DOCUMENTS

| | | | |
|---|---|---|---|
| 2,358,857 | 9/1944 | Gits | 425/DIG. 58 |
| 3,060,509 | 10/1962 | McCubbins, Jr. | 249/145 |
| 4,201,360 | 5/1980 | Schwartzburg et al. | 425/DIG. 58 |
| 4,520,061 | 5/1985 | Stoll et al. | 249/64 |
| 4,526,827 | 7/1985 | Stoll et al. | 249/64 |
| 4,588,158 | 5/1986 | Mehra | 249/64 |

Primary Examiner—Jill L. Heitbrink
Attorney, Agent, or Firm—Michael, Best & Friedrich

[57] ABSTRACT

A mold assembly for use in an injection molding process to mold a one-piece article such as a washing machine tub. The mold assembly includes first and second relatively moveable mold plates, a mold core projecting from the first mold plate, and a plurality of mold sidewall assemblies. The mold core includes an annular outer mold surface portion which tapers inwardly to provide draft to ease the removal of the molded article from the mold assembly, and which is provided with a plurality of generally teardrop-shaped projections. Each teardrop-shaped projection converges to its narrowed end in a direction opposite the direction of removal of the article from the mold core and is configured to further ease removal of the article from the mold assembly. The mold assembly also includes a plurality of core pins mounted on the mold sidewall assemblies. The core pins engage the enlarged end portions of the teardrop-shaped projections on the mold core when the mold is closed to form holes in the article, each hole being recessed in one of the teardrop-shaped depressions from the surrounding surface portion of the article.

22 Claims, 5 Drawing Sheets

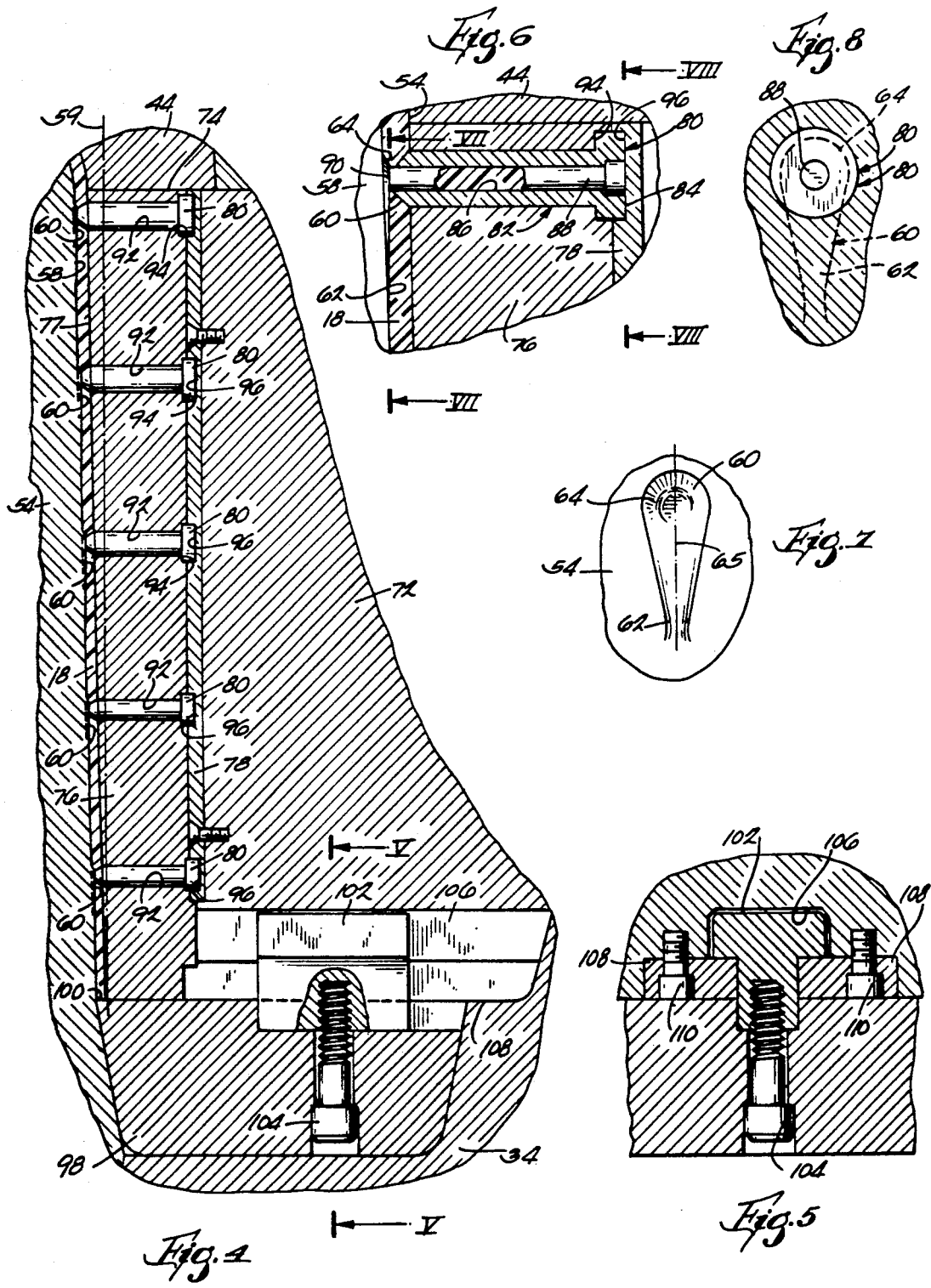

INJECTION MOLD ASSEMBLY AND METHOD FOR MANUFACTURING A PLASTIC TUB WITH HOLES

BACKGROUND OF THE INVENTION

The present invention relates to mold assemblies and methods for molding plastic articles and to the molded articles produced thereby. More particularly, the invention relates to an improved injection mold assembly configured to produce an integrally molded plastic tub having recessed drain holes and to a method for producing such a tub.

A basket or tub of the type used in clothes washing machines includes a circular bottom and cylindricall sidewalls extending generally perpendicularly from the bottom. It is known to cast such tubs of metal and to coat the tubs with porcelain to provide a smooth exterior and clean appearance. These tubs also include a plurality of drain holes that can be formed during the casting operation.

Washing machine tubs are also made of molded plastic. While plastic offers weight and cost advantages over metal, plastic tubs formed by conventional methods require assembly or further finishing of the molded product to produce a completed tub. In particular, in some prior art tub making techniques the drain holes must be drilled into the molded tub and deburred and in some cases it is also necessary to countersink or otherwise recess the holes. These finishing operations are time consuming and labor intensive.

To avoid the abovementioned assembling and finishing operations, injection mold assemblies configured to produce molded tubs have in the past employed metal core pins which are engageable with an opposing mold surface to form the drain holes in the tub. However, known injection mold assemblies have proven expensive to maintain and susceptable to wear. In particular, the core pins must each be precisely machined within tight tolerences to insure that each core pin is the correct length to match properly with the opposing mold surface. Repeated engagement between the core pins and the opposing mold surfaces results in wear on both the core pins and the mold surfaces, thereby permitting plastic to enter the space between the core pins and the opposed mold surfaces to form flashing over the drain holes. This flashing must be removed in a subsequent manufacturing step and thus increases the cost of the tub. Also, worn core pins must be replaced by core pins machined to the exact length as the core pins they are replacing and this further increases the cost of producing injection molded plastic tubs.

Additionally, the removal of molded tubs from injection molding machines has proven difficult due to the shape of the tub and to the provision of circular raised mold surfaces intended to provide for the recessing of the drain holes. These raised mold surfaces hinder the ability of the tub to slide off a central mold core and to be removed from the molding machine.

SUMMARY OF THE INVENTION

The invention generally provides a washing machine tub produced as a one piece, integrally molded and finished unit configured for easy removal from a tub mold assembly. The washing machine tub also includes drain holes arranged to prevent snagging of fabrics placed in the tub and configured to permit removal of the tub from an injection mold assembly following the molding operation.

The invention also generally provides an improved injection mold assembly constructed and designed to economically produce finished molded articles and to facilitate easy removal of such articles therefrom. In one embodiment, the mold assembly is configured to produce the abovementioned molded washing machine tub and includes core pins that are engageable with teardrop-shaped projections on a central mold core when the mold assembly is closed to produce recessed drain holes in the tub. The teardrop-shaped projections are configured and arranged to facilitate separation of the tub from the central mold core and withdrawal of the tub from the mold assembly. The mold assembly also preferably incorporates selected slanted molding surfaces to provide draft to the sidewalls of the molded tub to further ease removal of the tub from the mold assembly.

The core pins used in the mold assembly are preferably elastically deformable in response to engagement with the teardrop-shaped projections to reduce wear on both the core pins and the projections and to thereby make the mold assembly more durable than prior art mold assemblies. Due to their elastically deformable nature, it is not necessary that the core pins be machined to a precise length to match the corresponding teardrop-shaped projection. The core pins are also able to accomodate small amounts of wear by simply deforming less in response to engagement with the projections. Additionally, if the the core pins do become unacceptably worn they can be replaced with pins which need not be exactly the same length as the pins being replaced. Thus, careful machining or other preparation of the replacement pins before use is not needed.

More specifically, the invention provides a mold assembly for use in an injection molding process to mold a one-piece article including a cylindrical sidewall extending transversely from a bottom wall. The mold assembly includes a first mold plate and a second mold plate opposing the first mold plate and including an inwardly facing molding surface adapted to form the exterior side of the bottom wall of the article. Means are provided for supporting the first and second mold plates for movement toward and away from each other between a mold open position and a mold closed position. The mold assembly also includes a mold core projecting from the first mold plate in a direction parallel to the direction of movement of the first and second mold plates relative to one another. The mold core includes a free end and an annular outer mold surface portion adapted to form the interior surface of the cylindrical sidewall of the article and tapering inwardly in the aforementioned direction and toward the free end. The tapered mold core provides draft to ease removal of the molded article from the mold assembly. The annular outer mold surface portion of the mold core includes a plurality of generally teardrop-shaped projections. Each of the teardrop-shaped projections is adapted to form a teardrop-shaped depression in the interior surface of the cylindrical sidewall of the article, and each projection includes a narrowed end portion and an enlarged end portion converging toward the narrowed end portion thereof in the aforementioned direction and toward the first mold plate to further ease removal of the molded article from the mold core. The periphery of each teardrop-shaped projection is preferably rounded or arcuate to provide a gradual transition to the surrounding annular mold surface portion. The mold assembly also includes a plurality of mold sidewall assemblies each having an inwardly facing molding surface adapted to form a portion of the exterior surface of the cylindrical sidewall of the article. Means are provided for supporting the mold sidewall assemblies for movement between a mold closed position wherein the inwardly facing molding surfaces of the sidewall assemblies, the inwardly facing molding surface of the second mold plate, and the mold core cooperate to define at least part of a mold cavity which conforms to the desired dimensions of the article, and a mold open position wherein each of the mold sidewall assemblies is displaced outwardly of its mold closed position. To form holes in the cylindrical sidewall of the article, a plurality of core pins are fixed to the mold sidewall assemblies and project from the respective inwardly facing molding surfaces thereof. Each core pin engages the enlarged end portion of one of the teardrop-shaped projections on the mold core when the mold sidewall assemblies are in their mold closed positions.

The invention also provides a one-piece, injection molded washing machine tub including a plastic bottom wall and a plastic cylindrical sidewall molded integrally with the bottom wall and extending in a transverse direction from the bottom wall. The cylindrical sidewall diverges outwardly from the bottom wall to facilitate removal of the tub from the mold assembly, and the cylindrical sidewall includes an interior surface and a plurality of drain holes. The interior surface also includes a plurality of teardrop-shaped depressions, each of the drain holes extending from one of the teardrop-shaped depressions so as to be recessed from the interior surface. Each teardrop-shaped depression includes a narrowed end portion and a enlarged end portion converging toward the narrowed end portion in the aforementioned transverse direction and toward the bottom wall to further facilitate removal of the tub from a mold assembly.

The invention in addition provides a method for manufacturing a one-piece plastic washing machine tub including a bottom wall and a cylindrical sidewall extending transversely from the bottom wall and including therein a plurality of holes recessed from the interior surface of the cylindrical sidewall by depressions The method employs a mold assembly including opposed first and second mold dies, a central mold core extending from the first mold die, the mold core including a plurality of teardrop-shaped projections each converging toward the narrowed end thereof in the same direction, and a plurality of side mold dies around the mold core, each of the side mold dies including a plurality of core pins. The first step in the method is to move the first and second mold dies and the side mold dies to a mold closed position wherein the first and second mold dies and the side mold dies define a mold cavity conforming to the dimensions of the tub. When the side mold dies are in their closed positions each of the core pins engages the enlarged end portion of one of the teardrop-shaped projections on the mold core. Plastic is then injected into the mold cavity to form the molded tub. To remove the tub from the mold assembly, the second mold die is displaced away from the first mold die to an open position relative to the first mold die, and the side mold dies are displaced outwardly to withdraw the core pins from the holes formed thereby in the molded tub. The molded tub is then displaced from the mold core in a direction opposite the direction in which the teardrop-shaped projections converge.

Other features and advantages of the invention will become apparent to those skilled in the art upon review of the following detailed description, claims and drawings.

BRIEF DESCRIPTION OF THE DRAWINGS

FIG. 4 is an enlarged view, partially broken away, of a portion of the mold assembly shown in FIG. 1.

FIG. 5 is a view taken along line V—V in FIG. 4.

FIG. 6 is a further enlarged view, partially in section, of a portion of the mold assembly shown in FIG. 4.

FIG. 7 is a view taken along line VII—VII in FIG. 6 and showing in elevation a teardrop-shaped projection on the mold core of the mold assembly.

FIG. 8 is a view taken along line VIII—VIII in FIG. 6.

Figure 1:
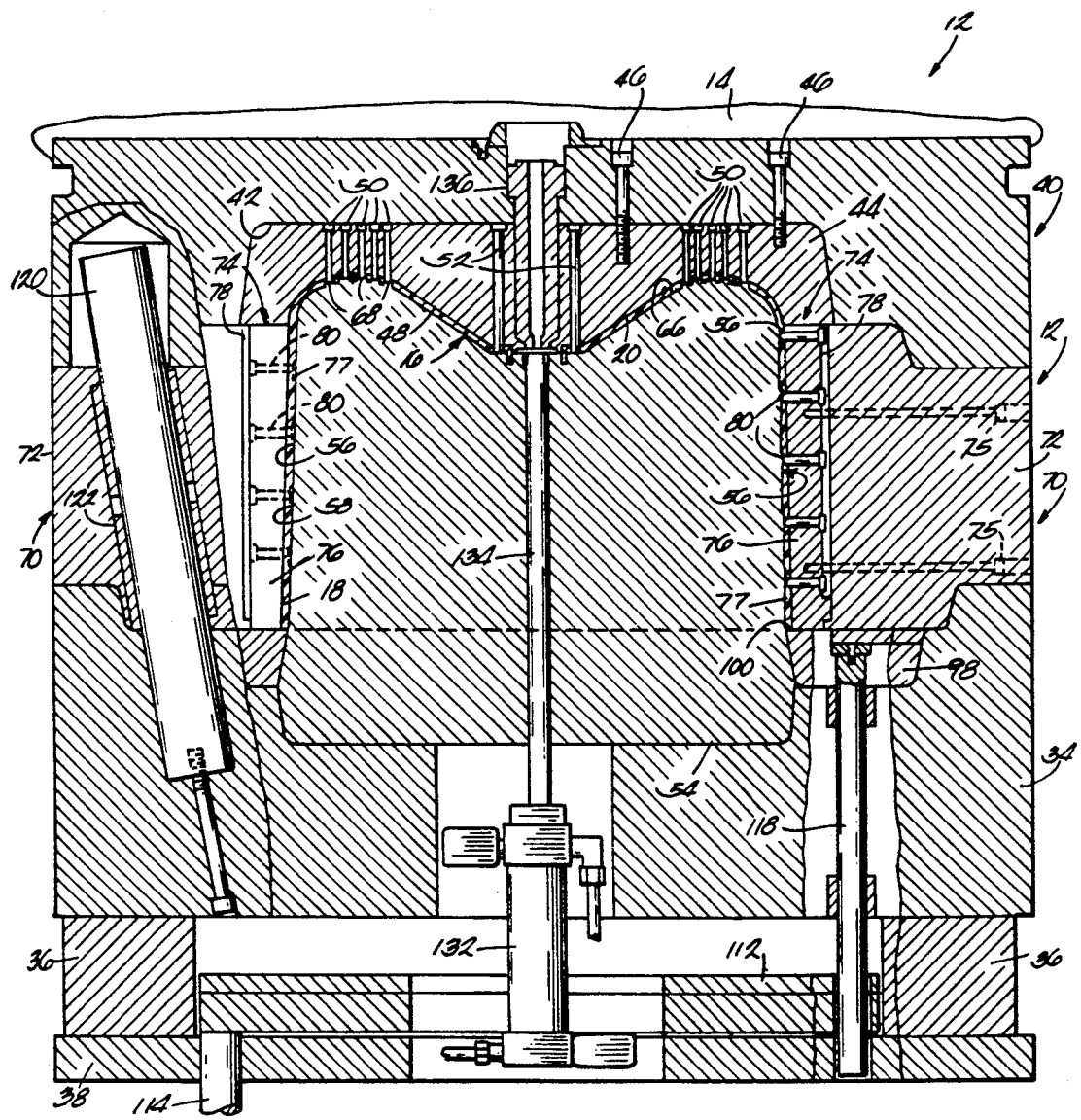
FIG. 1 is an elevation view of part of an injection molding assembly which is shown in section and with portions broken away and which is in a closed position around a molded article.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Illustrated in FIG. 1 is an injection mold assembly 12 embodying the invention. The mold assembly 12 defines a mold cavity for the manufacture of a molded article and is preferably adapted to be supported in a conventional injection molding machine in a manner known to those skilled in the art.

Figure 11:
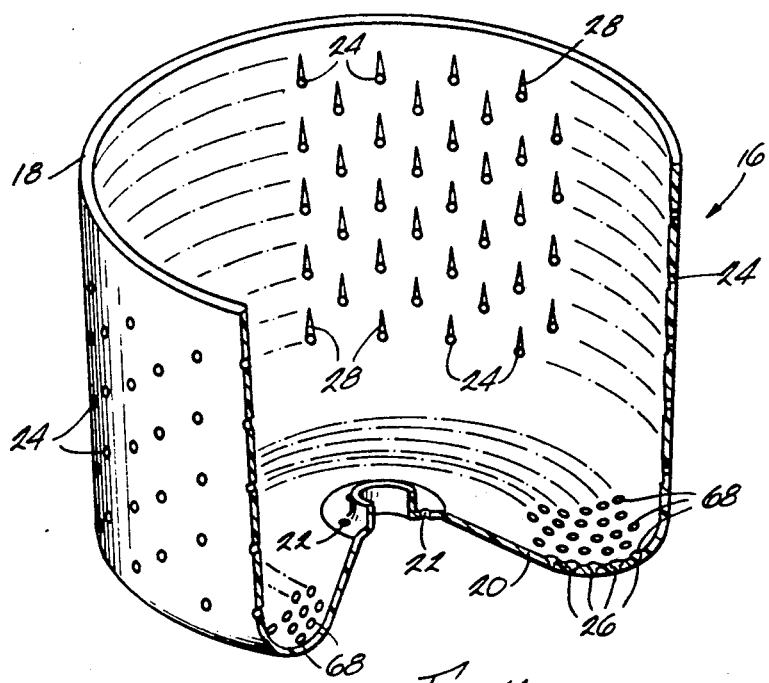
FIG. 11 is perspective view, partially broken away, of a washing machine tub formed using the mold assembly illustrated in FIGS. 1–10.

While the mold assembly 12 could be designed to produce a variety of molded articles, in the illustrated arrangement the mold assembly 12 is configured to produce a molded plastic clothes washing machine tub 16. As shown in FIG. 11, the molded tub 16 is of single piece, integrally molded construction and includes a generally cylindrical or annular sidewall 18 extending upwardly from a tub base or bottom wall 20. The tub sidewall 18 diverges slightly outwardly from the tub bottom wall 20 to ease removal of the tub 16 from the mold assembly 12.

To facilitate attaching the tub 16 to a washing machine, holes 22 are provided. Additionally, to permit water to drain from the tub 16, a plurality of drain apertures or holes 24 and 26 are formed in the tub sidewall 18 and the bottom wall 20, respectively. To reduce the possibility of clothes snagging on the tub 16, the drain holes 24 and 26 ar recessed from the interior surface of the tub 16 by smooth teardrop-shaped depressions 28 and generally circular depressions 30, respectively. The drain holes 24 and 26 and the depressions 28 and 30 are formed in the tub 16 as an integral part of the molding process, as is more fully explained below.

Figure 3:
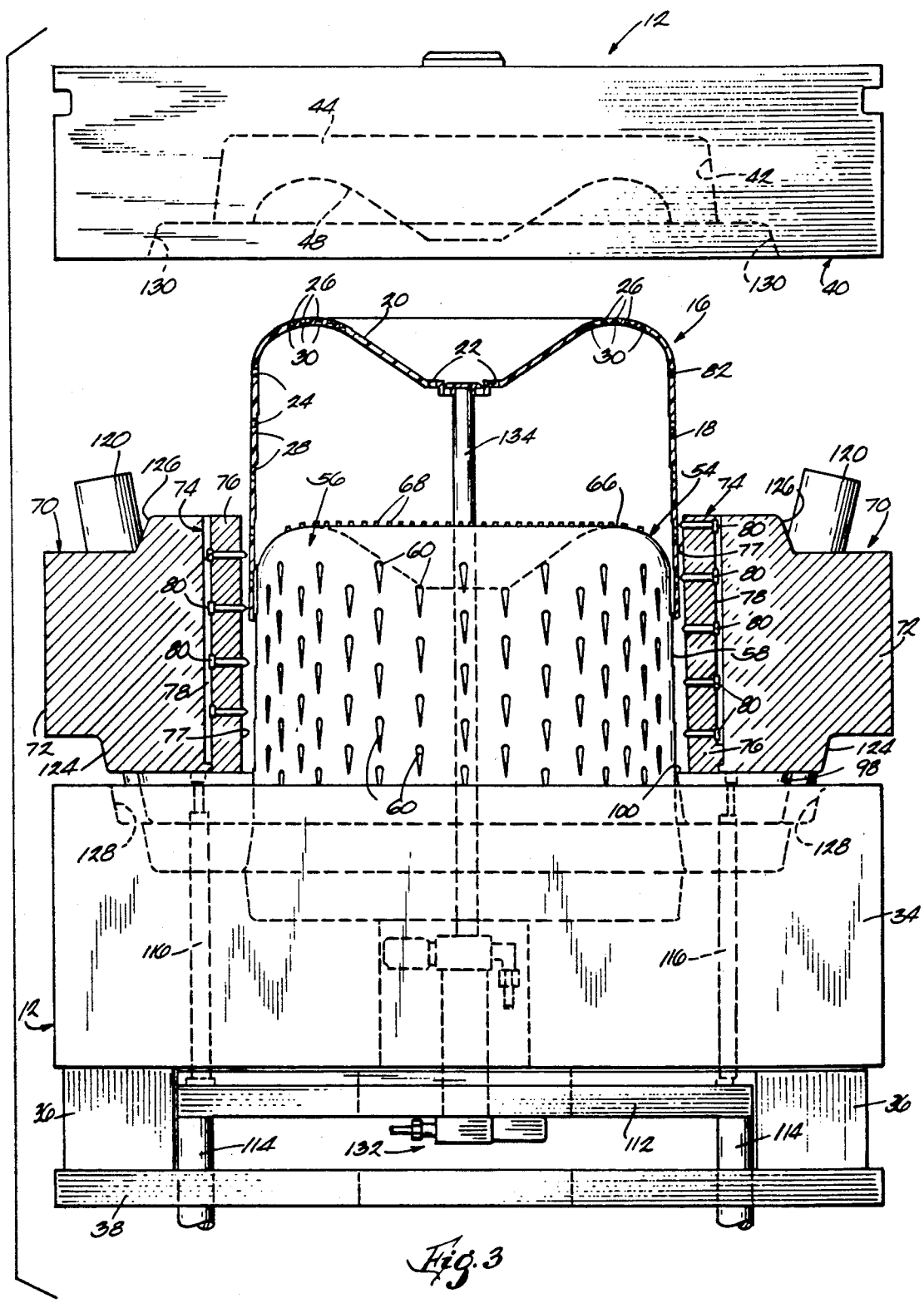
FIG. 3 is an elevation view similar to FIG. 1 and shown partially in section and with the mold assembly in an open position wherein the molded article can be removed from the mold.

To facilitate formation and removal of the tub 16, the mold assembly 12 is operably mounted in the injection molding machine (not shown) so as to be positionable between a mold closed position (shown in FIG. 1) wherein the tub 16 can be injection molded and a mold open position (shown in FIG. 3).

More specifically, the mold assembly 12 includes a first mold die or plate 34 fixed on rails 36 which are in turn fixed to a support plate 38 and a second mold die or plate 40 in opposed relation to the first mold plate 34. The first and second mold plates 34 and 40 are supported by the aforementioned injection molding machine in a conventional manner such that the mold plates 34 and 40 are moveable longitudinally toward and away from each other between mold open and closed positions shown in FIGS. 1 and 3.

The second mold plate 40 includes a cavity 42, and a cavity insert or die member 44 is preferably releaseably secured in the cavity 42 via threaded fasteners 46 or other suitable means. The die member 44 includes an inwardly facing molding surface 48 which forms the exterior side of the tub bottom wall 20. To form the drain holes 26 in the tub bottom wall 20, the second mold plate 40 is provided with a plurality of mold core pins 50 preferably arranged in generally annular, concentric rows which are staggered relative to one another. Additional mold core pins 52 (preferably four) are also provided to form the attachment holes 22 in the tub 16. The core pins 50 and 52 are preferably fixedly mounted to the die member 44 and protrude through the molding surface 48 and into the mold cavity when the mold assembly 12 is closed.

The mold assembly 12 also includes a central mold core 54 mounted on the first mold plate 34 and projecting therefrom in a direction parallel to the longitudinal axis 55 of the mold core 54 The mold core 54 includes an outer molding surface 56 having a generally annular surface portion 58 which tapers slightly inwardly toward the free end of the mold core 54 and which forms the interior surface of the tub sidewall 18. This slightly tapered configuration provides draft to permit the removal of the tub 16 from the mold assembly 12. While the draft or taper of the outer molding surface 56 could have other configurations, in the illustrated arrangement it tapers at an angle of approximately 3° with respect to a line 59 (see FIG. 4) perpendicular to the mold plates 34 and 40 and parallel to both the direction of movement of the mold plates 34 and 40 relative to one another and the longitudinal axis 55 of the mold core 54.

The annular surface portion 58 of the mold core 54 is provided with a plurality of portions 60 (see FIG. 3) which are raised from or project from the remainder of the annular surface portion 58. These raised portions or projections 60 are arranged in staggered rows and can be variously sized if desired. As shown in FIG. 7, each projection 60 is generally teardrop-shaped when viewed in elevation and forms a corresponding teardrop-shaped depression 28 around one of the drain holes 24 in the interior surface of the molded tub 16. The depressions 28 recess the holes 24 from the interior surface of the cylindrical sidewall 18 of the molded tub 16 such that fabrics in the tub 16 will not become snagged on the edges of the holes 24.

Figure 10:
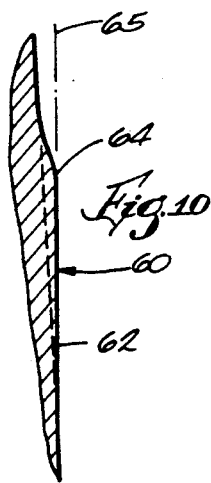
FIG. 10 is a view taken along line X—X in FIG. 9.
Figure 12:
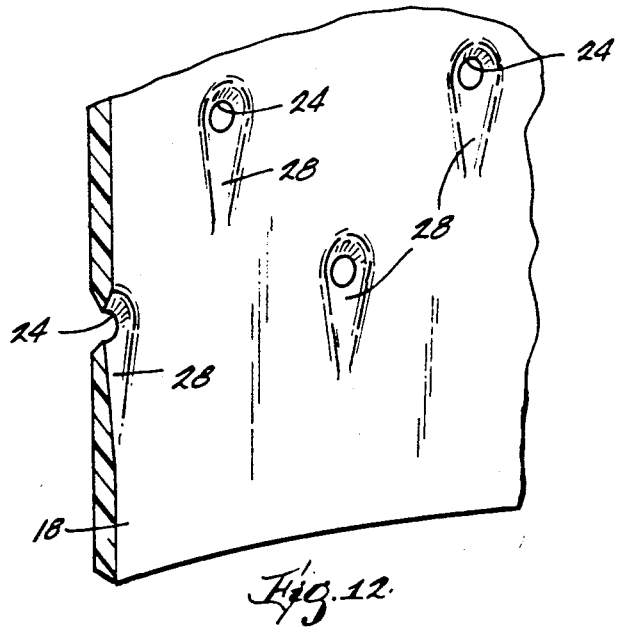
FIG. 12 is an enlarged view of a portion of the interior of the tub illustrated in FIG. 11.
Figure 9:
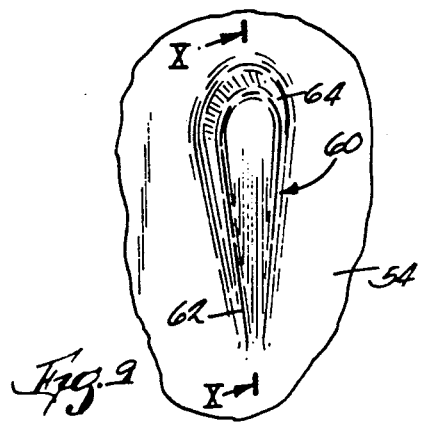
FIG. 9 is a perspective view of the teardrop-shaped projection shown in FIG. 7.

The orientation and configuration of the teardrop-shaped projections 60 eases separation and removal of the molded tub 16 from the mold core 54. More specifically, in the particular embodiment illustrated in the drawings (see FIGS. 7, 9 and 10), each teardrop-shaped projection 60 includes a narrowed end portion 62 and an enlarged end portion 64 that converges toward the narrowed end 62 in a direction parallel to the longitudinal axis 55 of the mold core 54 and toward the first mold plate 34. Thus, the teardrop-shaped projections 60 are oriented with their narrowed end portions 62 pointing in a direction parallel to the direction in which the molded tub 16 is removed from the mold core 54.

Also, the teardrop-shaped projections 60 are contoured to slide from the corresponding depressions 28 with minimal resistance when the molded tub 16 is removed from the mold core 54. In particular, the narrowed end 62 of each teardrop-shaped projection gradually and smoothly flares or merges into the annular surface portion 58, and the periphery of each projection 60 is curved or arcuate to converge into the surrounding annular surface portion 58 of the mold core 54. These features provide a smooth transition from the teardrop-shaped projections 60 to the surrounding part of the annular surface portion 58. Also, each teardrop-shaped projection 60 becomes gradually shallower as the periphery thereof is approached from the center of its enlarged end 64, and the outer surface of each teardrop-shaped projection 60 preferably includes a longitudinal centerline 65 parallel to the axis 55 of the mold core 54. The centerline 65 defines an outermost edge portion of the projection 60 and extends tangentially to the center of the enlarged end portion 64 thereof. These characteristics further facilitate extraction of the teardrop-shaped projections 60 from the corresponding teardrop-shaped depressions 28 and ease separation and removal of the molded tub 16 from the mold core 54.

The outer molding surface 56 also includes a second surface portion 66 over the free end of the mold core 54 for forming the interior surface of the tub bottom wall 20. This second surface portion 66 includes a plurality of generally circular projections 68 raised from the remainder of the second surface portion 66 to form the circular depressions 30 in the interior surface of the tub 16. The circular projections 68 correspond with and are positioned to engage the ends of the core pins 50 when the first and second mold plates 34 and 40 are closed to recess the drain holes 26 in the tub bottom wall 20 to prevent fabrics from snagging thereon.

Figure 2:
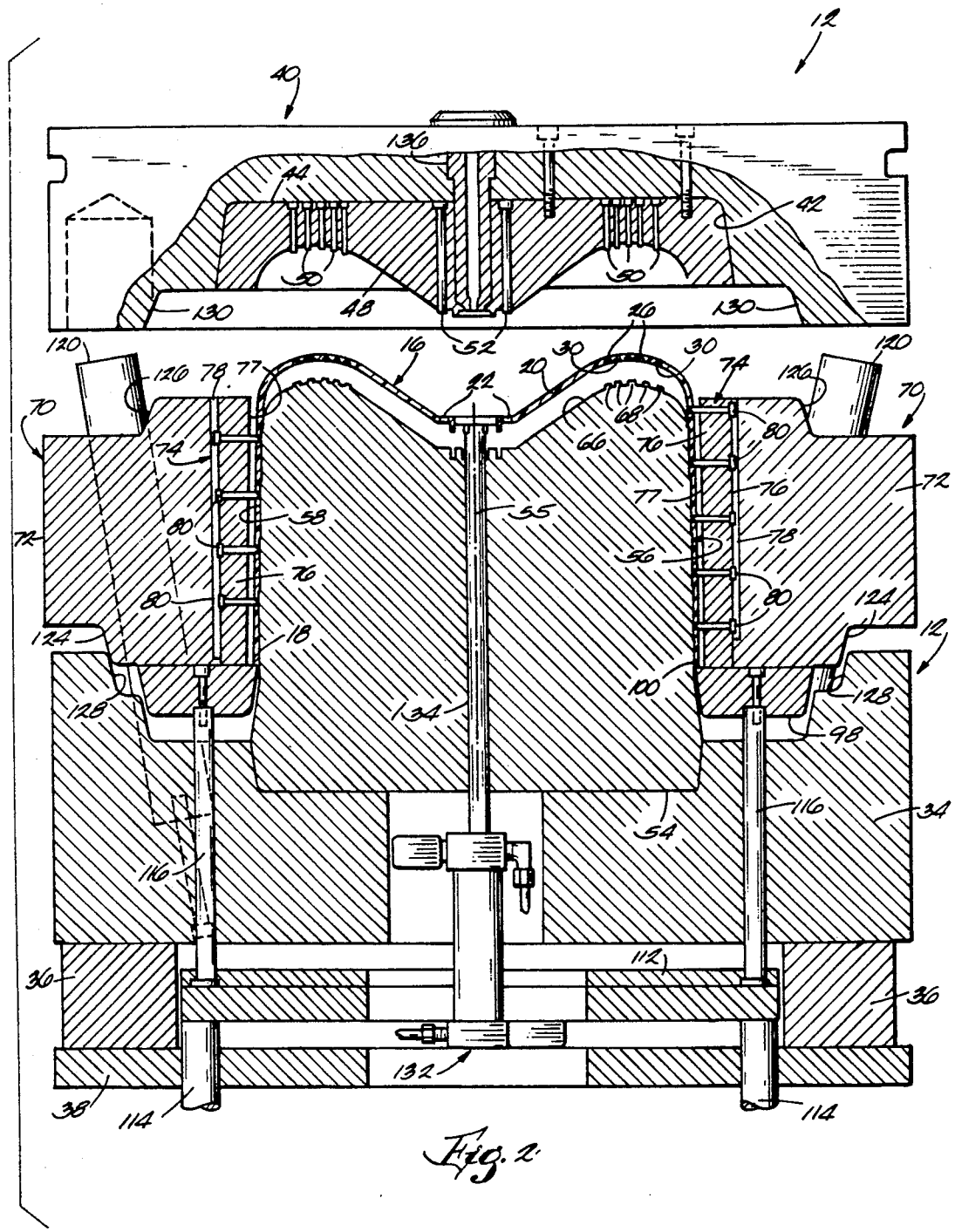
FIG. 2 is an elevation view similar to FIG. 1 and showing the mold assembly partially open.

The injection mold assembly 12 also includes a plurality of mold sidewall assemblies 70 arranged to surround the mold core 54. While it is preferred that four mold sidewall assemblies 70 be employed, the two mold sidewall assemblies 70 shown in FIGS. 1–3 are exemplary of the sidewall assemblies not shown.

Each sidewall assembly 70 includes a lifter or sidewall member 72 and a sidewall insert 74 releaseably fixed to the sidewall member 72 via threaded fasteners 75 (see FIG. 1) or other suitable means. This arrangement facilitates replacement of the sidewall insert 74, if desired. The sidewall inserts 74 each include an inner plate 76 having an inwardly facing molding surface 77 that tapers or slants inwardly in the direction of the second mold plate 40 and preferably at the same angle as the draft angle of the mold core 54. The molding surfaces 77 cooperate with the annular surface portion 58 of the tapered mold core 54 to form the tub sidewall 18. Each molding surface 77 is preferably semi-circular to form a 90 degree arc portion of the exterior surface of the tub sidewall 18. Each sidewall insert 74 also includes an outer key plate 78 releaseably fixed to the inner plate 76 thereof to hold additional mold core pins in place, as will be further explained below.

To form the drain holes 24 in the tub sidewall 18, each sidewall assembly 70 is provided with a plurality of mold core pins 80 which can be variously sized if desired. As shown in FIG. 6, in the specific embodiment of the invention shown in the drawings, each of the core pins 80 includes an outer sleeve 82 including a head portion 84 and a bore 86. The outer sleeve 82 is preferably made of steel, although other materials could also be used. Each core pin 80 also includes an inner pin 88 housed in the bore 86. The inner pin 88 is made of a resilient, non-metallic material capable of withstanding the temperatures at which the mold assembly 12 operates without being significantly affected. While other materials can be employed, it is preferred that the inner pins 88 be made of a high temperature plastic or elastomeric material such as high temperature nylon or Delrin. In the illustrated embodiment, Delrin sold by Midland Plastics of Brookfield, Wis. under the part number 016-002-0021 is used. The inner pin 88 includes an end portion 90 which extends externally of the outer sleeve 82 and which is engageable with one of the teardrop-shaped projections 60 when the mold assembly 12 closes. This engagement causes the inner pins 88, and especially the end portions 90, to be compressed and to elastically deform.

While in the illustrated arrangement each core pin 80 includes a metallic outer sleeve 82 and an inner pin 88 made of resilient non-metallic material, in other arrangements the resilient core pins 80 could have other constructions.

As shown in FIG. 4, the inner plates 76 of the mold sidewall assemblies 70 are provided with pin bores 92 having countersunk portions 94 to support the core pins 80. Each core pin 90 is received in one of the pin bores 92 with the head portion 84 thereof being housed in the countersunk portion 94. The outer plate 78 is also provided with countersunk portions 96 to receive the head portions 84 of the core pins 80. The outer plate 78 can be removed from the inner plate 76 to replace the core pins 80, if desired. In the illustrated arrangement, the pin bores 92 are arranged on the sidewall assemblies 70 to position the core pins 80 in annular staggered rows to correspond to the teardrop-shaped projections 60. The core pins 80 project inwardly through the molding surfaces 77 of the sidewall assemblies 70 and are positioned in opposed facing relation to the teardrop-shaped projections 60 on the mold core 54 so that the core pins 80 engage the projections 60 when the mold assembly 12 is closed (see FIG. 1).

Means are provided for supporting the mold sidewall assemblies 70 for movement between a closed or injection molding position (FIG. 1) and an open or retracted position (FIG. 3). While various supporting means can be employed, in the illustrated arrangement the supporting means includes a stripper ring 98 around the mold core 54 and for causing longitudinal movement of the mold sidewall assemblies 70 toward and away from the first mold plate 34. The stripper ring 98 includes an inner portion 100 which forms the top edge of the tub 16.

The mold sidewall assembly supporting means also includes an arrangement for mounting each of the mold sidewall assemblies 70 on the stripper ring 98 for limited lateral sliding movement relative thereto. This mounting arrangement includes four T-slot slide arrangements, an exemplary one of which is shown in FIGS. 4 and 5. The illustrated slide arrangement includes a T-shaped slide member 102 fixed to the stripper ring 98 by a threaded fastener 104 or other suitable means. The slide member 102 is received in a complementary slot 106 formed in part by a pair of wear plates 108 secured to the sidewall member 72 by threaded fasteners 110 or other suitable means.

Means are also provided for selectively moving the mold sidewall assemblies 70 between the injection mold and retracted positions. While various moving means can be employed, in the illustrated arrangement the moving means includes a press knock arrangement including a knock-out plate 112 supported for longitudinal reciprocal movement by a plurality of rods 114 (only two of which are shown). Extension and retraction of the rods 114 to move the knock-out plate 112 is controlled by a hydraulic motor (not shown). The stripper ring 98 and the knock-out plate 112 are connected for common movement by a plurality of stripper lift pins 116 (see FIG. 2) that extend through the first mold plate 34. While it should be understood that the use of a plurality (preferably eight) of stripper lift pins 116 spaced around the circumference of the stripper ring 98 is preferred, only an exemplary pair of stripper lift pins 116 are shown in the drawings. Additionally, a plurality of guide pins 118 (preferably four), one of which is illustratively shown in FIG. 1, are provided to more accurately guide movement of the stripper ring 98.

Means are also provided to cause movement of the mold sidewall assemblies 70 outwardly away from the mold core 54 in response to longitudinal movement of the stripper ring 98. In the illustrated arrangement, such means includes outwardly angling lifter or guide pins 120. While it is preferred that a pair of guide pins 120 guide the movement of each mold sidewall assembly 70, only one guide pin 120 is illustratively shown in FIG. 1. Each guide pin 120 is fixedly mounted on the first mold plate 34 and extends through bushings 122 in one of the sidewall members 72 to guide a mold sidewall assembly 70 in a predefined path between the injection molding and retracted positions.

To prevent outward deflection of the mold parts, and particularly the mold sidewall assemblies 70, during the plastic injection process, the mold assembly 12 includes means for securing the mold sidewall assemblies 70 in the molding position when the mold assembly 12 is closed. While other securing means could be used, the illustrated securing means includes the provision of opposite sloping cam surfaces 124 and 126 on each mold sidewall assembly 70 and corresponding sloping cam surfaces 128 and 130 on the first and second mold plates 34 and 40, respectively. When the mold assembly 12 is closed, the cam surfaces 124 and 126 mate with and engage the cam surfaces 128 and 130 to form a cam interlock to secure the mold sidewall assemblies 70 against outward movement until the mold assembly 12 is opened. However, even in the event of slight outward deflections of the mold sidewall assemblies 70, the deformable inner pins 84 of the core pins 80 should stay engaged with the projections 60 to form satisfactory holes 24.

To assist in removing the molded tub 16 from the opened mold assembly 12, a hydraulic piston and cylinder assembly 132 or other suitable motor means is mounted on the knock-out plate 112 for movement therewith. The piston and cylinder assembly 132 is connected to a remote hydraulic fluid source (not shown) and includes an extensible rod 134. The rod 134 has a distal end which is engageable with the tub bottom wall 20 to lift the tub 16 from the mold core 54 for subsequent withdrawal from the mold assembly 12.

To form the tub 16, the mold assembly 12 is first closed (see FIG. 1) to define a mold cavity conforming to the desired dimensions of the tub 16. Closing of the mold assembly 12 causes the inner pins 88 of the core pins 80 to resiliently engage the teardrop-shaped projections 60 on the mold core 54, such engagement resulting in the elastic deformation of at least the end portions 90 of the inner pins 88. Additionally, with the mold assembly 12 closed, the core pins 50 and 52 in the second mold plate 40 respectively engage the circular projections 68 and the central part of the second surface portion 66 of the mold core 54. Plastic material is then injected into the mold cavity under desired temperature and pressure conditions to form the molded tub 16. In the illustrated arrangement, the plastic is introduced into the mold cavity through a sprue bushing 136 in the second mold plate 40 and from an injection nozzle (not shown), however other means could also be used to introduce plastic into the mold cavity.

Following formation of the molded tub 16, the first mold plate 34 is withdrawn from the second mold plate 40 followed by or simultaneously with retraction of the mold sidewall assemblies 70 to fully open the mold assembly 12. When the mold assembly 12 opens, the portion 100 of the stripper ring 98 engaging the top edge of the tub 16 pushes the tub 16 off the mold core 54 (see FIG. 2). As the tub 16 is moved from the mold core 54 each teardrop-shaped projection 60 gradually slides down the corresponding teardrop-shaped depression 28 to permit the smooth withdrawal of the projection 60 from the interior surface of the tub sidewall 18. As the stripper ring 98 is moved in the direction of the second mold plate 40, the mold sidewall assemblies 70 also move laterally outwardly away form the mold core 54 to pull the ends of the core pins 80 out of the holes 24 formed in the molded tub 16. The draft provided by the tapered mold core 54 further eases separation and displacement of the tub 16 from the mold core 54. After the mold assembly 12 is opened, the rod 134 is extended to further displace the tub 16 from the mold core 54 (see FIG. 3) so that the tub 16 can thereafter be completely removed from the mold assembly 12 by a worker or by mechanical means.

Advantageously, the mold assembly 12 is configured to provide improved separation and removal of a molded article therefrom. More specifically, the mold assembly 12 incorporates teardrop-shaped projections 60, the shape, contour and orientation of which allows them to slide easily from the teardrop-shaped depressions 28 formed thereby while still effectively recessing the holes 24 in the tub 16. Thus, the molded tub 16 is more easily separated and removed from the mold assembly 12 than was possible with prior mold arrangements. Additionally, the draft provided by the tapered mold core 54 further facilitates removal of the tub 16 from the mold assembly 12.

A further advantage of the mold assembly 12 arises from the incorporation of resilient core pins 80 which facilitate integrally molding the drain holes 24 into the tub 16 during the injection molding operation. The elastically deformable inner pins 88 of the core pins 80 reduce wear in the mold assembly 12 and produce generally flash-free, good quality drain holes even in the presence of some wear, unlike core pins made entirely of metal. Thus, the resilient core pins 80 not only produce finished holes which do not require further drilling, deburring, or other finishing operations, but also lengthen the lives of the mold components to produce more economical molded tubs 16. Additionally, the resilient core pins 80, and particularly the inner pins 88, are replaceable with pins which are not exactly the same length as the pins being replaced, thereby further reducing the cost and maintenance associated with the mold assembly 12 that would otherwise be incurred if entirely metal core pins were used.

The above described advantageous features have been combined in the present invention to produce a one-piece, plastic injection molded and finished washing machine tub 16 which heretofore could not be satisfactorily and economically produced.

Other features and advantages of the invention are set forth in the following claims.

I claim:

1. A method for manufacturing a one-piece plastic washing machine tub including a bottom wall and a cylindrical sidewall extending transversely from the bottom wall and including therein a plurality of holes, the holes being recessed from the interior surface of the cylindrical sidewall by depressions, said method employing a mold assembly including opposed first and second mold dies, a central mold core extending from the first mold die, the mold core including a plurality of teardrop-shaped projections each converging toward the narrowed end thereof in the same direction, and a plurality of side mold dies around the mold core, each of the side mold dies including a plurality of core pins, said method comprising the steps of:

moving the first and second mold dies and the side mold dies to a mold closed position wherein each of the core pins engages the enlarged end portion of one of the teardrop-shaped projections on the mold core and wherein the first and second mold dies and the side mold dies define a mold cavity conforming to the dimensions of the tub, injecting plastic into the mold cavity to form the molded tub, displacing the second mold die to an open position relative to the first mold die, displacing the mold side dies outwardly to withdraw the core pins from the holes formed thereby in the molded tub, and displacing the molded tub from the mold core in a direction opposite the direction in which the teardrop-shaped projections converge.

2. A method for manufacturing as set forth in claim 1 wherein the step of displacing the second mold die precedes the step of displacing the molded tub from the mold core.

3. A method for manufacturing as set forth in claim 2 wherein the step of displacing the molded tub from the mold core is performed simultaneously with the step of displacing the mold side dies, and is followed by the step of extending a rod member to further remove the molded tub from the mold assembly.

4. A mold assembly for use in the manufacture of an article, said mold apparatus comprising:
a mold plate,
a mold core projecting from said mold plate, said mold core including an outer surface portion adapted to form at least part of an interior surface of the article, said outer surface portion including a generally teardrop-shaped projection,
a plurality of mold sidewall assemblies, each of said mold sidewall assemblies including an inwardly facing molding surface adapted to form a portion of an exterior surface of the article,
means for supporting said mold sidewall assemblies for movement relative to said mold core and between a mold closed position wherein said inwardly facing molding surfaces and said mold core cooperate to define at least part of a mold cavity which conforms to the desired dimensions of the article, and a mold open position wherein each of said mold sidewall assemblies is displaced outwardly of its mold closed position, and
a core pin supported on one of said mold sidewall assemblies, said core pin engaging said teardrop-shaped projection when said one mold sidewall assembly is in its mold closed position, and said core pin being adapted to form a hole in the article.

5. A mold assembly as set forth in claim 4 wherein said outer surface portion of said mold core includes a plurality of generally teardrop-shaped projections constructed and arranged to facilitate removal of the article from said mold core, each of said teardrop-shaped projections being adapted to form a teardrop-shaped depression in the interior surface of the article, and wherein said mold assembly includes a plurality of core pins, each of said core pins being supported on one of said mold sidewall assemblies projecting from said inwardly facing molding surface thereof, and engaging one of said teardrop-shaped projections when said mold sidewall assemblies are in their mold closed position to facilitate formation of a hole in the article, the hole being recessed in one of the teardrop-shaped depressions from the surrounding portion of the interior surface of the article.

6. A mold assembly as set forth in claim 4 wherein said teardrop-shaped projection includes a narrowed end portion and an enlarged end portion, said teardrop-shaped projection converging from said enlarged end portion toward said first mold plate to said narrowed end portion, and wherein said core pin engages said enlarged end portion of said teardrop-shaped projection when said one mold sidewall assembly is in its mold closed position.

7. A mold assembly as set forth in claim 6 wherein said mold core includes a longitudinal axis, and wherein said teardrop-shaped projection converges in a direction parallel to said longitudinal axis.

8. A mold assembly as set forth in claim 7 wherein said mold core includes a free end, and said outer surface portion of said mold core is annular and tapers inwardly toward said free end.

9. A mold assembly as set forth in claim 7 wherein said teardrop-shaped projection includes an outer surface having a longitudinal center line parallel to said longitudinal axis of said mold core, said center line extending tangentially to the outermost point of said enlarged end portion, and said center line defining an outer edge portion of said teardrop-shaped projection.

10. A mold assembly as set forth in claim 6 wherein said narrowed end portion gradually merges into said outer surface portion so as to provide a smooth transition therebetween.

11. A mold assembly as set forth in claim 6 wherein said teardrop shaped projection has a periphery which is generally arcuate so as to converge into said surrounding outer surface portion to form a gradual transition therebetween.

12. A mold assembly as set forth in claim 6 wherein said enlarged end portion of said teardrop-shaped projection includes a center, and wherein said teardrop-shaped projection becomes gradually shallower as the periphery thereof is approached from said center.

13. A mold assembly as set forth in claim 4 wherein said core pin is made at least partially of a resilient non-metallic material, and wherein said core pin is elastically deformable responsive to said engagement between said core pin and said teardrop-shaped projection.

14. A mold assembly for use in the manufacture of an article having an annular interior surface, said mold apparatus comprising:
a first mold plate,
a second mold plate opposing said first mold plate,
means for supporting said first and second mold plates for movement toward and away from each other between a mold open position and a mold closed position,
a mold core projecting from said first mold plate in a direction parallel to the direction of movement of said first and second mold plates relative to one another, said mold core including a free end and an annular outer mold surface portion tapering inwardly in said direction and toward said free end and being adapted to form the annular interior surface of the article, said outer mold surface portion including a generally teardrop-shaped projection, said teardrop-shaped projection being adapted to form a teardrop-shaped depression in the annular interior surface of the article,
a plurality of mold sidewall assemblies, each of said mold sidewall assemblies including an inwardly facing molding surface adapted to form a portion of the exterior surface of the article,
means for supporting said mold sidewall assemblies for movement relative to said mold core and between a mold closed position wherein said inwardly facing molding surfaces and said mold core cooperate to define at least part of a mold cavity which conforms to the desired dimensions of the article, and a mold open position wherein each of said mold sidewall assemblies is displaced outwardly of its mold closed position, and
a core pin supported on one of said mold sidewall assemblies, said core pin engaging said teardrop-shaped projection when said one mold sidewall assembly is in its mold closed position, and said core pin being adapted to form a hole in the article.

15. A mold assembly as set forth in claim 14 wherein said annular outer surface portion of said mold core includes a plurality of generally teardrop-shaped projections constructed and arranged to facilitate removal of the article from said mold core, each of said teardrop-shaped projections being adapted to form a teardrop-shaped depression in the annular interior surface of the article, and wherein said mold assembly includes a plurality of core pins, each of said core pins being supported on one of said mold sidewall assemblies, projecting from said inwardly facing molding surface thereof, and engaging one of said teardrop-shaped projections when said mold sidewall assemblies are in their mold closed position to facilitate formation of a hole in the article, the hole being recessed in one of the teardrop-shaped depressions from the surrounding portion of the annular interior surface of the article.

16. A mold assembly as set forth in claim 15 wherein each of said teardrop-shaped projections of said mold core includes an enlarged end portion and a narrowed end portion, each of said teardrop-shaped projections converging from said enlarged end portion thereof to said narrowed end portion thereof in a direction toward said first mold plate and parallel to said direction of movement of said first and second mold plates relative to one another, and wherein each of said core pins engages the enlarged end portion of one of said teardrop-shaped projections of said mold core when said mold sidewall assemblies are in their mold closed positions.

17. A mold assembly as set forth in claim 16 wherein each one of said teardrop-shaped projections includes an outer surface having a longitudinal center line parallel to said direction of movement of said first and second mold plates relative to each other, said center line extending tangentially to the outermost point of said enlarged end portion of said respective teardrop-shaped projection, and said center line defining an outer edge portion of said respective teardrop-shaped projection.

18. A mold assembly as set forth in claim 16 wherein said enlarged end portion of each of said teardrop-shaped projections includes a center, and wherein said teardrop-shaped projection becomes gradually shallower as the periphery thereof is approached from said center.

19. A mold assembly as set forth in claim 14 wherein said core pin is made at least partially of a resilient non-metallic material, and wherein said core pin is elastically deformable responsive to said engagement between said core pin and said teardrop-shaped projection when said one mold sidewall assembly is in its mold closed position.

20. A mold assembly for use in an injection molding process to mold a one-piece article including a cylindrical sidewall extending transversely from a bottom wall, said mold assembly comprising:
 a first mold plate,
 a second mold plate opposing said first mold plate and including an inwardly facing molding surface adapted to form the exterior side of the bottom wall of the article,
 means for supporting said first and second mold plates for movement toward and away from each other between a mold open position and a mold closed position,
 a mold core projecting from said first mold plate in a direction parallel to the direction of movement of said first and second mold plates relative to one another, said mold core including a free end and an annular outer mold surface portion tapering inwardly in said direction and toward said free end and being adapted to form the interior surface of the cylindrical sidewall of the article, said annular outer mold surface portion including a plurality of generally teardrop-shaped projections, each of said teardrop-shaped projections being adapted to form a teardrop-shaped depression in the interior surface of the cylindrical sidewall of the article, each of said teardrop-shaped projections including a narrowed end portion and an enlarged end portion converging toward said narrowed end portion thereof in said direction and toward said first mold plate,
 a plurality of mold sidewall assemblies, each of said mold sidewall assemblies including an inwardly facing molding surface adapted to form a portion of the exterior surface of the cylindrical sidewall of the article,
 means for supporting said mold sidewall assemblies for movement between a mold closed position wherein said inwardly facing molding surfaces of said mold sidewall assemblies, said inwardly facing molding surface of said second mold plate, and said mold core cooperate to define at least part of a mold cavity which conforms to the desired dimensions of the article, and a mold open position wherein each of said mold sidewall assemblies is displaced outwardly of its mold closed position, and
 a plurality of core pins, each of said core pins being mounted on one of said mold sidewall assemblies and projecting from said inwardly facing molding surface thereof, each of said core pins engaging the enlarged end portion of one of said teardrop-shaped projections of said mold core when said mold sidewall assemblies are in their mold closed positions, and each of said core pins being adapted to form a hole in the cylindrical sidewall of the article, the hole being recessed in one of the teardrop-shaped depressions from the surrounding portion of the annular interior surface of the article.

21. A mold assembly as set forth in claim 20 wherein each of said teardrop-shaped projections includes an outer surface having a longitudinal center line parallel to said direction, said center line extending tangentially to the outermost point of said respective enlarged end portion, and said center line defining an outer edge portion of said respective teardrop-shaped projection, wherein said narrowed end portion of each of said teardrop-shaped projections gradually merges into said annular outer surface portion so as to provide a smooth transition therebetween, wherein each of said teardrop-shaped projections has a periphery which is generally arcuate so as to converge into said surrounding annular outer surface portion to form a gradual transition therebetween, and wherein said enlarged end portion of each of said teardrop-shaped projections includes a center, each of said teardrop-shaped projections becoming gradually shallower as the periphery thereof is approached from said center thereof.

22. A mold assembly as set forth in claim 21 wherein each of said core pins is made at least partially of a resilient non-metallic material, and wherein each of said core pins is elastically deformable responsive to the aforementioned engagement with one of said teardrop-shaped projections of said mold core.

* * * * *